United States Patent
Krolikowski

(10) Patent No.: US 7,098,159 B2
(45) Date of Patent: Aug. 29, 2006

(54) ARTICLES FOR CASTING APPLICATIONS COMPRISING CERAMIC COMPOSITE AND METHODS FOR MAKING ARTICLES THEREOF

(75) Inventor: Cathryn R. Krolikowski, Independence, OH (US)

(73) Assignee: General Electric Company, Pittsfield, MA (US)

( * ) Notice: Subject to any disclaimer, the term of this patent is extended or adjusted under 35 U.S.C. 154(b) by 52 days.

(21) Appl. No.: 10/350,827

(22) Filed: Jan. 23, 2003

(65) Prior Publication Data

US 2005/0288168 A1 Dec. 29, 2005

Related U.S. Application Data

(60) Provisional application No. 60/349,998, filed on Jan. 23, 2002.

(51) Int. Cl.
*C04B 35/581* (2006.01)
*C04B 35/583* (2006.01)

(52) U.S. Cl. .................. 501/96.4; 501/98.4; 501/98.6; 428/698; 164/428; 164/480

(58) Field of Classification Search ............... 501/96.4, 501/98.4, 98.6, 96.1; 164/428, 480; 428/698
See application file for complete search history.

(56) References Cited

U.S. PATENT DOCUMENTS

| 4,885,264 A | 12/1989 | Sindlhauser et al. | |
| 4,913,408 A | 4/1990 | Hoggard et al. | |
| 5,227,347 A | 7/1993 | Fukase et al. | 501/96 |
| 5,286,685 A | 2/1994 | Schoennahl et al. | 501/87 |
| 5,336,454 A * | 8/1994 | Montgomery | 264/681 |
| 5,389,587 A | 2/1995 | Nakashima et al. | 501/96 |
| 5,401,696 A * | 3/1995 | Montgomery | 501/96.4 |
| 5,925,585 A * | 7/1999 | Schoennahl et al. | 501/98.1 |
| 6,051,058 A | 4/2000 | Crisci et al. | |
| 6,145,581 A | 11/2000 | Takeuchi et al. | |
| 6,458,732 B1 | 10/2002 | Doza et al. | 501/94 |
| 6,513,573 B1 | 2/2003 | Guasto et al. | |
| 6,667,263 B1 * | 12/2003 | Guillo et al. | 501/96.4 |

FOREIGN PATENT DOCUMENTS

| EP | 1002776 | * 5/2000 |
| JP | 03 271151 | 12/1991 |
| WO | WO 9932246 | 7/1999 |

OTHER PUBLICATIONS

McManus, George, "Horizontal Casting: A New Direction for Steel", Iron Age, Apr. 5, 1985, pp. 29-33.
Bagsarian, Tom, ed., "Strip casting gets serious", New Steel, Dec. 2000, pp. 18-22.
Sigl, L.S., et al., "Design Considerations for Boron Nitride Break Rings for Horizontal Continous Casting of Steel", 1992 Steelmaking Conference Proceedings, p. 345.

* cited by examiner

*Primary Examiner*—Karl Group

(57) ABSTRACT

A refractory article for use in casting operations wherein said article is subject to prolonged contact with molten metal of at least 1500° C. for at least three hours, said article comprises a ceramic composite consisting essentially of about 10 to about 40 wt. % mullite; about 35 to about 5 wt. % aluminium nitride; and at least about 20 wt. % boron nitride, for forming a reactive coating layer covering at least 80% of exposed surfaces and providing corrosion/erosion protection for said article against molten metal.

12 Claims, 2 Drawing Sheets

1

ARTICLES FOR CASTING APPLICATIONS COMPRISING CERAMIC COMPOSITE AND METHODS FOR MAKING ARTICLES THEREOF

CROSS-REFERENCE TO RELATED APPLICATIONS

This Application claims rights of priority from U.S. provisional patent application Ser. No. 60/349,998, filed Jan. 23, 2002, which is hereby incorporated by reference.

FIELD OF THE INVENTION

The invention relates articles for prolonged use in metal casting applications.

BACKGROUND OF THE INVENTION

For more than ten years, continuous casting process has been actively developed and improved by several major steel companies. In continuous casting operations, molten metal such as steel, aluminium, copper, solidifies against the mold walls while it is simultaneously withdrawn from the bottom of the mold. Equipment used in casting operations must possess properties include thermal shock resistance, stability at high temperature, and ease of machinability—all lending themselves to the use of refractory-based components.

In the continuous casting process, the molten metal comes into contact with various refractory material components wherein the solidification of the cast metal product is initiated, including but not limited to the nozzles introducing the liquid metal into the ingot mold, the casing of the thermocouple being in contact with the molten metal, the slidegate plates and stopper rods used to control the flow of molten metal, and the side walls which ensure the confinement of the liquid metal between the cooled surfaces of the twin rolls. The side walls are also called side dams, end dams, edge dams, or break rings in horizontal casting operations.

In an example of the strip casting process, molten metal is introduced between two nickel-coated copper rolls with the side walls being in continuous contact with the rolls containing the molten metal. In additional to the chemical interaction between the side dam components and the molten or partially solidified metal, the side dam refractory components are subject to high stresses due to localized temperature differences of about 1 500–2000° C. to roll contact and back plate temperature of about 200–500° C. Strip casting typically requires prolonged contact with molten metals—much longer than typically unexpected in continuous casting operations, of at least 3 hours or more. Therefore, besides the tensile stresses developed in the roll contact areas in a typical strip casting process, the chemical interaction intensifies in strip casting as compared to continuous casting with the long processing time and the length of the strip produced in strip casting operations (several miles), thus leading to frequent and localized material erosion on the refractory equipment. Therefore, it is imperative in strip casting operations for the refractory side dams to have a minimum volume loss and sufficient strength to provide a seal between the rollers and the molten metal and last through a casting operation, while having sufficient lubricating properties and being sufficient weak as not to damage the surface of the coating on the rollers.

The life of the refractory-based components is determined by the mechanical and chemical wear in continuous exposure to molten metal, or by process parameters such as the batch size of the melt to be cast or the casting conditions. At the end of the life of the component, it is typical of the refractory equipment volume to be mostly eroded away either mechanically or chemically. Besides the refractory equipment itself, it is also typical for the coating of the rollers in contact with the refractory side dams to be damaged/worn away in a casting cycle.

Published patent application WO9932246 discloses an apparatus for lubricating edge dams in twin-roll strip casting machine, wherein the edge dams are made of a refractory based material comprising a silicon nitride/boron nitride ($Si_3N_4$—BN) composite, an aluminium nitride/boron nitride (AlN—BN) composite, or a silicon carbide/boron nitride (SiC—BN) composite.

To solve the problem of the deterioration of the refractory equipment in casting operations, U.S. Pat. No. 6,051,058 discloses a protective aqueous layer of about a few 1/10 mm to a few mm thick as a coating for refractory material members that are used in casting operations. The aqueous coating comprises a dispersion in an aqueous solvent of 20–50 wt. % of hexagonal boron nitride and at least one metal oxide selected from the group consisting of zircon, zirconia, alumina, and silica.

Applicants have found that it is not necessary to apply a protective coating layer on refractory equipment as in the prior art. Our invention relates to refractive side dams comprising a ceramic composite which forms a reaction/coating layer on the surface of refractory equipment that surprisingly and substantially prolongs the life of the refractory-based side dams used in casting operations, while exhibiting excellent tribological properties in friction environments, i.e., minimizing the wear and damages on the rollers being in contact with the refractory side dams in casting operations.

SUMMARY OF THE INVENTION

The invention relates to refractory-based equipment comprising a ceramic composite consisting essentially of: about 10 to about 40 wt. % mullite; about 5 to about 35 wt. % aluminium nitride; and at least about 20 wt. % boron nitride; wherein said refractory equipment upon exposure to molten metal of at least about 1500° C. for three hours, forms a reactive layer coating at least 80% of said refractory equipment.

BRIEF DECRIPTION OF THE DRAWING

DESCRIPTION OF THE INVENTION

Figure 1:
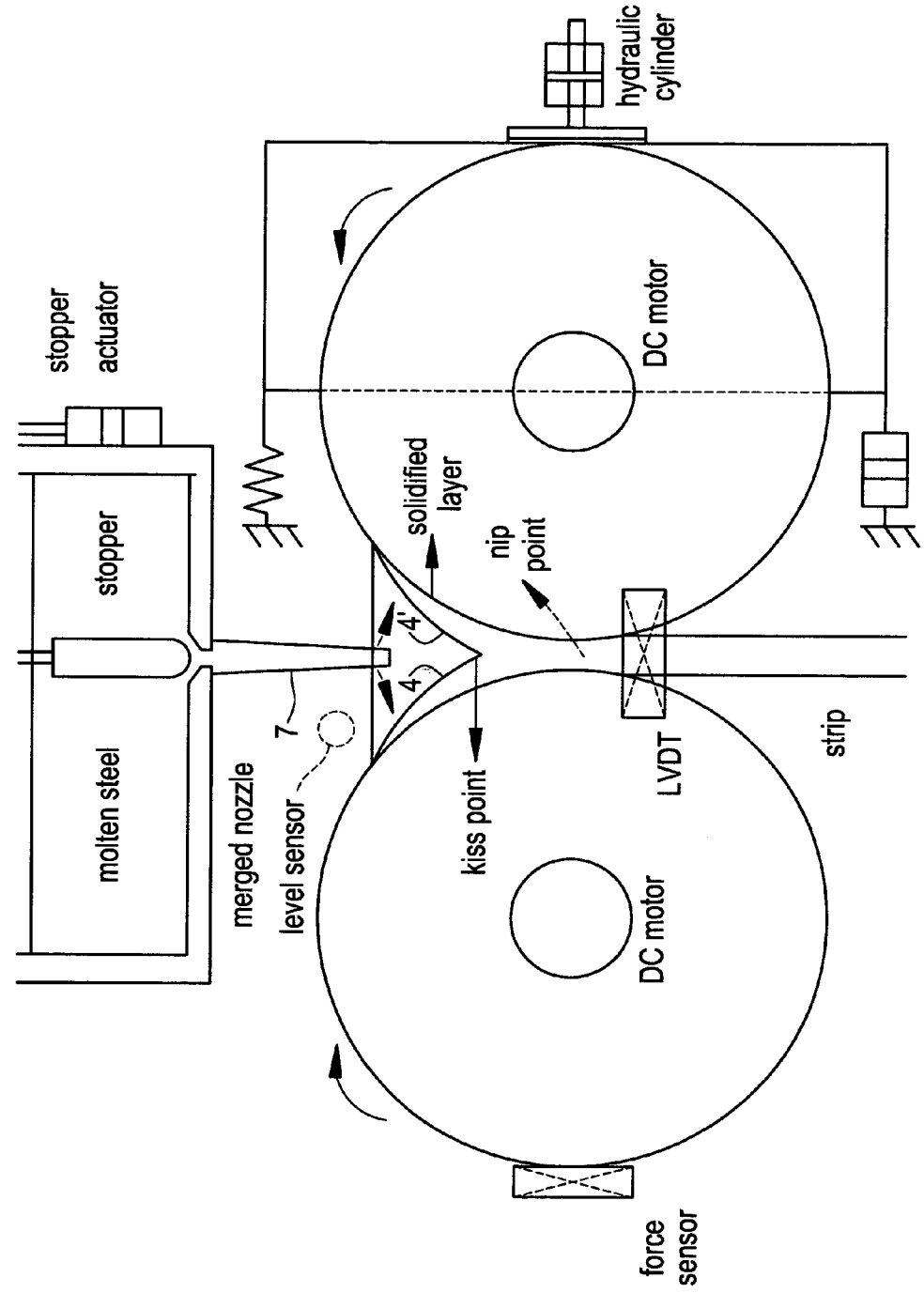
FIG. 1 shows a casting operations with ingot mold for continuous twin-roll casting, equipped with the side walls and a casting nozzle.

Casting Operations. FIG. 1 demonstrates one embodiment of a typical casting operation. The rolls 1, 1' with parallel and horizontal shafts (not shown), cooled internally and capable of being rotated in opposite directions about their shafts by conventional means (also not shown). The rolls are separated by a minimum distance corresponding to the thickness of the strip intended to be cast. Side walls 4, 4' comprising the composite material of the present invention are applied against the edge of the rolls so as to close of laterally the casting space defined by the cooled surfaces of the rolls. Nozzle 7 made of the ceramic composite of the present invention, connected to a distributor (not shown), enclosing the liquid metal is for the purpose of bringing the liquid metal into the casting space. Nozzle 7 comprises two outlet ports 9, 9', each pointed towards one of the side walls 4, 4'. The liquid metal solidifies against the cooled side surfaces of the rolls 1, 1' to form to solidified skins 10, 10' which are joined together to form the cast strip 11 a few mm in thickness, which is extracted continuously from the ingot mold.

It should be noted that the refractory articles of the present invention are suitable for casting operations as well as non-casting operations, as long as there is a need for prolonged exposure to molten metals and continuous contact with metallic moving parts.

The Ceramic Composite of the Invention: The composite for use in the refractory equipment of the present invention, forming a protective coating layer on refractory equipment in molten metal operations, comprises a mixture of ceramic materials boron nitride (BN), mullite ($3Al_2O_3$-$2SiO_2$), and aluminium nitride (AlN).

The article of the present invention comprises a ceramic composite consisting essentially of: about 10 to about 40 wt. % mullite; about 5 to about 35 wt. % aluminium nitride; and at least about 20 wt. % boron nitride. In one embodiment, the article comprises a composite of about 15 to 35 wt. % mullite; about 10 to 30 wt. % aluminium nitride; and at least about 25 wt. % boron nitride. In a third embodiment, the refractory article comprises a composite having 20 to 30 wt. % mullite; about 5 to 25 wt. % aluminium nitride; and at least about 30 wt. % boron nitride. In a fourth embodiment, the article comprises less than about 40 wt. % mullite and about less than 30 wt. % aluminium nitride. In a fifth embodiment, the article comprises more than about 15 wt. % mullite and more than about 10 wt. % aluminium nitride.

Mullite is a refractory material with a nominal composition of $3Al2O3.SiO2$, commercially available from various sources, including Accuratus Corporation of New Jersey, U.S.A. In one embodiment, mullite is in the form of zirconium mullite or zirconia mullite, a fused product of alumina and zircon. In another embodiment, the mullite is in powder form with an average particle size of about 0.1 to about 75 microns. In yet a third embodiment, the mullite is a fused zirconia mullite having a size of about 2 to 45 microns.

Boron nitride and aluminium nitride are commercially available from various sources, including Accuratus Corporation. In one embodiment, the source for boron nitride is a recycled BN-containing powder, reclaimed from various sources including side dams. In one embodiment, the boron nitride has a size of about 0.1 to 45 microns. In another embodiment, the boron nitride has a size of about 1 to 25 microns.

In one embodiment of the invention, the composite further comprises a optional densification aid and/or heat activated boding agent in an amount of up to 5 weight percent. The additive is selected from boron oxides, calcium oxide, magnesium oxide, cerium oxide, yttrium oxide, boric acid, cryolite, a noncalcium fluoride salt, a silicate compound, a phosphate compound, calcium silicate cement, calcium aluminate cement, fluorspar, magnesium chloride, ball clay, kaolin, refractory frit, phenolic resin, furan resin, pitch, and mixtures thereof. In one embodiment, the optional additive is the densification aid CaO. In a second embodiment, the oxide mixtures such as magnesium oxide, cerium oxide, or yttrium oxide are added as stabilizers.

Shaped Refractory Articles of the Present Invention. In order to form the composite, the powders are homogeneously blended in a manner known, per se, in a mixer commonly used in the art such as a V-blender, double cone blender, twin-shell blender, drum blender, and the like.

In one embodiment, a temporary binder is added to the mixture. In one embodiment, about 25% of the total mixture needed is first pre-blended for about 30 minutes with an intensifier bar. After the pre-blend is prepared, the blender is then loaded to produce the main blend for the composite. In one embodiment, the V-blender is layered with successive layers of the materials as known by those skilled in the art.

To form the equipment for use in casting operations of the present invention, the powder blend maybe added directly to a graphite mold for densification.

In another embodiment, the main powder blend is first pre-pressed into compacts and granulated before being added to the graphite mold. Densification by hot-pressing takes place as a function of temperature and pressure. The temperature and pressure selected should be sufficient to form the ceramic composite but below the temperature that the mixture would melt. The time period for the hot pressing step should be continued until the ceramic composites effectively or substantially stop shrinking.

In one embodiment, hot pressing is carried out in an inert atmosphere at a temperature of about 1300–2000° C. at a pressure of about 1800 to about 2500 psi. In a second embodiment, the firing and drying is done in an inert atmosphere at a temperature of about 1500–1900° C. In a third embodiment, the hot pressing is carried at a temperature of about 1800° C. and a pressure of about 2000 psi. In yet another embodiment, the mixtures are isostatically hot-pressed in a vacuum tight closed case to form suitable shaped refractory parts. The parts with the required dimensions are subsequently machined out of the ingots thus obtained.

As used herein, an inert atmosphere is a vacuum or an atmosphere composed of an inert gas such as argon, nitrogen, or the like.

In one embodiment, the hot pressed article has a density of at least about 85% TD (based on TD or the theoretical density of the powder). In a second embodiment, the hot pressed article has a density of at least about 90% TD. In a third embodiment, the hot pressed article has a density of at least about 92% TD. In a fourth embodiment, the hot pressed article has a density of at least about 97% TD.

In yet another embodiment, the composite may be cold formed and pressureless sintered to result in a shaped article for use in molten metals and in contact/friction with a continuous moving object such as a roller in a casting operation. The process may involve the following steps: a) milling the composite mixture in a V-blend or a similar blending equipment to a predetermined particle size of about 2 to 10 microns; b) optionally coating the particles with a lubricant, e.g., a resin material formed from vinyl chloride and acetate; c) cold-forming the particles into a desired shape article; and d) pressureless sinter the shaped article under an inert atmosphere at a temperature of about 1500 to 2000° C. to form a strong structure.

The article of the present invention can be in various forms and for various utilities wherein there is prolonged exposure (of three hours or more) to molten metals. Examples include side dams (break ring) for containment and processing of molten metals; nozzles for atomisation and rapid solidification processes; stir rods, stopper rods, and thermocouple protection devices; and shields and insulators for physical vapor deposition (PVD) processes.

Figure 2:
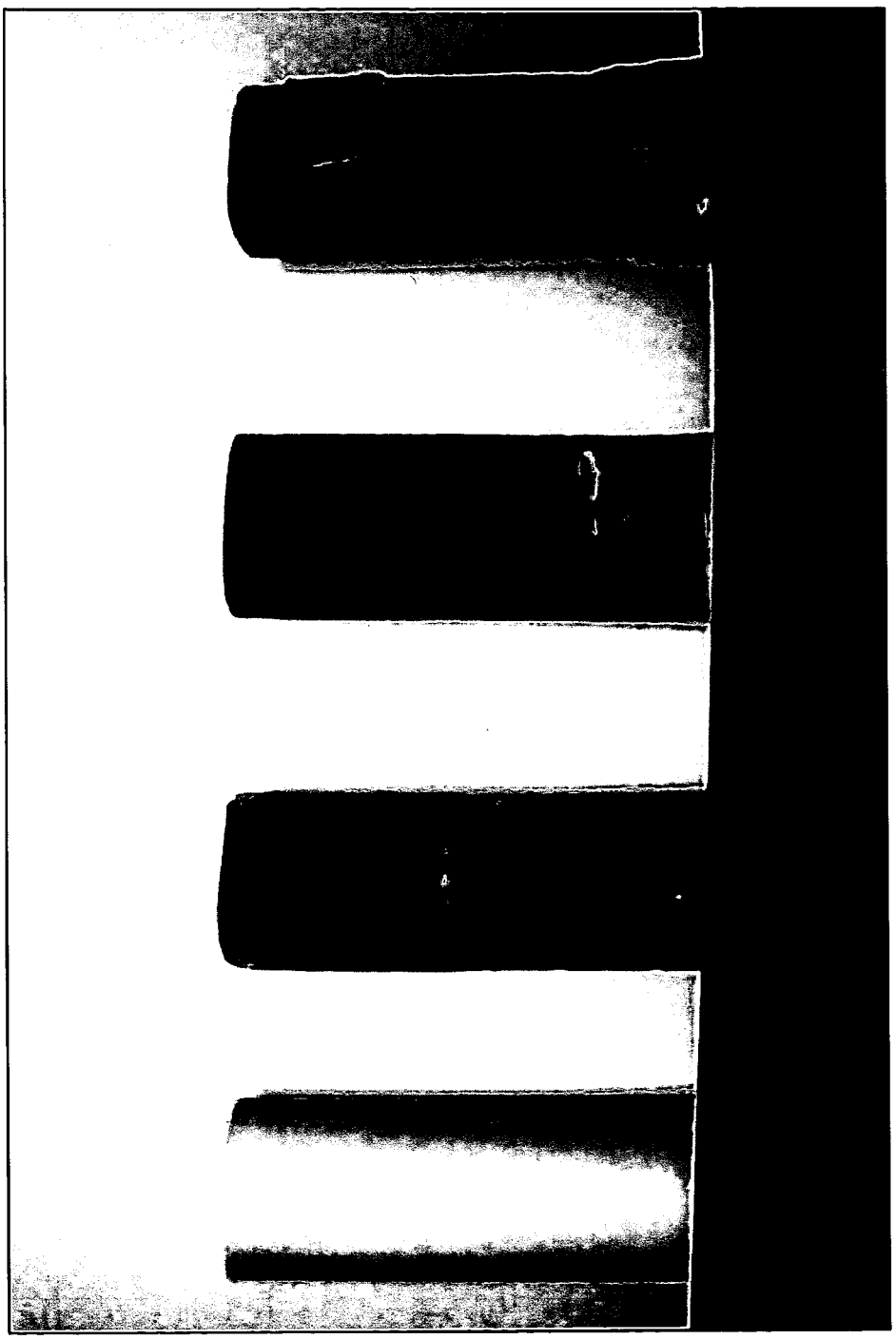
FIG. 2 is a photograph showing the protective reactive layer forming on the articles of the present invention.

The Articles of the Invention—Formation of Reactive Coating Layer. The articles of the present invention, comprising the ceramic composite as described above, after being in contact with molten metal at a temperature of at least 1500° C., as typically expected in strip casting operations and for a prolonged period of time of at least 3 hours, surprisingly forms a reaction layer substantially coats and protects the surface of the refractory component in contact with molten metal, as shown in the $2^{nd}$ and $3^{rd}$ samples in FIG. 2. The first sample in the Figure is a refractory sample prior to being submerged in molten metal. The fourth sample in the Figure is a refractory sample of the prior art, comprising a base of powders of BN, an oxide, and a carbide.

By "substantially" is meant that after a component comprising the ceramic composite of the present invention is in contact with molten metal for at least three hours, it forms a coating layer of which covers at least 80% of the surface area in contact with the molten metal.

Depending on the composition of the composite material, the type of the molten material, the process condition of the casting operation, the coating layer is in the form of a smooth, glassy, and uniform coating in one embodiment. In another embodiment of the present invention, the protective coating layer is a rough and/or porous, but still covering at least 80% of the surface area in contact with the molten metal. In a second embodiment, the covered area is at least 85% of the refractory surface in contact with the molten metal. In another embodiment, the covered surface area is at least 90%.

Applicants have found that the coating layer, which is formed on the refractory equipment upon contact with molten metal in casting operations, acts as a diffusion limiting coating which allows the underlying ceramic parts to better resist chemical attack. It is also believed that the coating layer on the article of the present invention, acts as an interface layer providing more corrosion resistance than the original ceramic material. Additionally, the layer allows few impurities to leach into the molten metal as the refractory equipment is in use.

Besides the function of providing a protective coat/layer for the underlying refractive equipment, the article of the present invention exhibits excellent tribological properties its friction contact/rubbing with the coating of the rollers thus minimizes the friction and wear on the rollers as compared to the articles of the prior art. In one embodiment of the invention, the article of the invention exhibits a wear rate of less than 0.2 $mm^3$/N/m. In a second embodiment of the invention, the wear rate is less than 0.15 $mm^3$/N/m. In a third embodiment, the wear rate is less than 0.10 $mm^3$/N/m. In a fourth embodiment, the wear rate is less than 0.075 $mm^3$/N/m. In a fifth embodiment, the wear rate is less than 0.05 $mm^3$/N/m.

The refractory article of the present invention is further characterized by excellent friction properties, with the composite being self-lubricating, i.e., having a sufficient coefficient of friction that minimizes the mechanical wear and damage impact on the coating of the rollers in contact with the refractory article. In one embodiment, the composite has a coefficient of friction in the range of about 0.4 to about 0.9. In a second embodiment, the coefficient of friction is greater than 0.5. In a third embodiment, the coefficient of friction is in the range of about 0.6 to 0.7. In a fourth embodiment, the coefficient of friction is about 0.8 or less. In a fifth embodiment, the coefficient of friction is about 0.5 or more.

The refractory article of the present invention further exhibit desirable hardness properties as not to damage other equipment being in contact with the article, i.e., the rollers being in contact with the side dams. In one embodiment of the invention, the refractory article has a hardness expressed in Rockwell in the range of at least about 60. In a second embodiment, the hardness is at least about 70 (Rockwell H). In a third embodiment, the hardness is at least about 80. In a fourth embodiment, the hardness is of less than 130. In a fifth embodiment, the hardness is in the range of about 60 to about 100. In a sixth embodiment, the hardness is about between 70 to 95.

EXAMPLES

The following examples are provided to illustrate the invention but are not intended to limit the scope of the invention.

Materials used: The following materials are used in the examples of the present invention:

SOBN: an alloy powder from Elektroschmelzwerk Kempten GmbH of Munich, Germany, as disclosed/described in U.S. Pat. No. 4,885,264, comprising a base of powders of BN (i.e., boron nitride), an oxide (e.g., $ZrO_2$), and a carbide (e.g., sic).

ZSBN: another alloy powder composite from Carborundum/Elektroschmelzwerk Kempten GmbH of Munich, Germany, also as disclosed/described in U.S. Pat. No. 4,885,264, comprising a base of powders of BN (i.e., boron nitride), an oxide (e.g., $ZrO_2$), and a carbide (e.g., ZrC).

SiAlON BN: an alloy of silicon nitride, aluminium oxide and boron nitride, available under the tradename SiAlON® from Versuvius Crucible Company (a Cookson Company), as disclosed/described in U.S. Pat. No. 4,913,408.

Other materials: Compositions as indicated in the table. Please note that BN is boron nitride, commercially available from various sources; M is mullite, a refractory material with a nominal composition of 3 $Al_2O_3.SiO_2$, also readily commercially available; Zirconia Mullite is a co-fusion product of high purity alumina and zircon, commercially available from a number of sources including Keith Refractories of the UK with a particle size of about 75 microns and is composed of about 76 wt. % $Al_2O_3$ about 24 wt. % $SiO_2$ with a minor amount of $Na_2O/K_2O$, $Fe_2O_3$, CaO, free iron, TiO and MgO; AlN is aluminium nitride, a powder produced by the direct nitridation of aluminium vapor, also commercially from a number of suppliers.

Types of Tests: The sample articles are subject to the following tests:

Thermal shock test. The test involves submerging a sample into a molten melt of about 1600° C. for a period of one to three hours, removing the sample to air quench, and then visually inspecting the samples for signs of cracking or spalling.

Corrosion test. Sample bars are cut from each billet, some parallel and some perpendicular to the pressing direction, and then submerged and rotated at 60 revolutions per minute (RPM) in molten metal, i.e., carbon steel or stainless steel at about 1500–1700° C. The samples after being submerged in molten metal for three hours, are removed and observed, and reduction in the diameter of each sample is measured as percent reduction per hour.

Triobological test. In regards to tribometry, friction and wear experiments are run on a standard pin-on-disk apparatus at 450° C. in which a pin with a hemispherical radius of 10 mm is placed in sliding contact (a sliding velocity of 0.5 m/sec, nickel static substrate)

with the flat, coated surface of a rotating disk. Normal load (2N load) is applied by dead weights and friction force is continuously measured with a temperature-compensated strain gauge bridge circuit.

Examples: In all the examples, the powder mixture (or the commercially available powder sample such as SOBN, ZSBN, and SiAlON BN) is loaded in a twin shell V-blender. The blender is run for one hour. The mixture is unloaded from the blender and placed in a graphite mold, which has been previously painted with a Boron Nitride based paint to prevent ticking of the composite. The composite is dried for at least 12 hours. Several Grafoil® spacers are placed between the powder and the graphite rams. The powder is pre-compacted in the mold at room temperature to a pressure of 200 psi. The mold is loaded into a hot press furnace. The furnace is purged with Nitrogen. The temperature is ramped at a rate of approximately 3–4° C./min to 1000° C., held at 1000° C. for 30 minutes then pressure is applied at a rate of 2 psi/min to 1000 psi of compaction pressure while temperature continues to ramp at 3–4° C./min to approximately 1640–1675° C. The pressure and temperature are held for at least 1.5 hours then power is turned off. When the billet is ~1450° C., it is ejected into the tapered section of the mold to avoid material sticking to the die walls.

Sample bars from the billet are subject to corrosion tests and thermal shock tests as described above.

Results of the experiments are as shown in Table 1. The results are shown as a percent reduction in the diameter of each sample with and without the "reactive coating layer." (SLAG: with the layer; WITHOUT SLAG: with the layer being physically removed). The reduction of the diameter is one of the indicators of the erosion/corrosion characteristics of the refractory sample.

It should be noted that samples in experiments 1 and 2 (100% boron nitride or aluminium nitride) show signs of crumbling or almost being disintegrated after being removed from the molten metal and there is no formation of reactive layer.

Samples in experiments 3, 4, and 5 (SOBN, ZSBN, and SiAlON) show some sign of some reactive coating forming on the samples, except that the coating layer covers less than 75% of the surface area of the samples and quite unstable—consequently spalling off into the molten metal or shortly after removal from the melt.

The refractory samples of the present invention show minimum corrosion (less than 1% reduction in diameter, and in some instances with a gain in diameter) and with an almost uniform reactive layer covering most of the surface. When the reactive layer is removed, the samples of the present invention show less than about 4% reduction in diameter.

In tribological tests, the sample from Example 10 has an average wear rate of 0.023 mm3/N/m in the parallel direction and 0.044 mm3/N/m in the perpendicular direction, a coefficient of friction of 0.61 in both parallel and perpendicular directions; and a hardness (expressed as Rockwell H) of 71 in parallel direction and 82 in perpendicular direction. Example 8 shows an average wear rate of about with 0.018 mm3/N/m in the parallel direction and 0.099 mm3/N/m in the perpendicular direction; a coefficient of friction of 0.76 in the parallel direction and 0.73 in the perpendicular direction; and a hardness (expressed as Rockwell H) of 93 in parallel direction and 86 in perpendicular direction.

TABLE 1

| Example* | Wt. % BN | Wt. % AlN | Wt. % Mullite | Wt. % Zr-Mullite | Wt. % Zr | ave. T ° C. | Theo. Density | CS 1006 slag/no slag | SS 304 slag/no slag | SS 203 slag/no slag | SS 316 slag/no slag | Aluminum slag/no slag |
|---|---|---|---|---|---|---|---|---|---|---|---|---|
| 1 | 100 | 0 | 0 | 0 | 0 | 1800 | — | 9.33 | 29.3 | — | — | 0/0.65 |
| 2 | 60 | 40 | 0 | 0 | 0 | 1850 | — | 1.14 | 0.79/6.0 | — | — | — |
| 3 | | | SOBN | | | — | — | 4.44/7.11 | — | 2.67/8.67 | — | — |
| 4 | | | ZSBN | | | — | — | 1.78/7.11 | 0.44/3.51 | 0/3.95 | — | cracked |
| 5 | | | SiAlON | | | — | — | — | 4.0/14.0 | — | — | — |
| 6 | 35 | 0 | 0 | 65 | 0 | 1615 | 84 | 0.76/3.06 | 3.43/4.95 | — | — | — |
| 7 | 30 | 5 | 0 | 65 | 0 | 1645 | 94 | 0.46/2.74 | — | — | — | — |
| 8 | 30 | 10 | 0 | 60 | 0 | 1617 | 86 | 0/2.67 | 0.38/2.29 | — | — | Gain/0.44 |
| 9 | 57 | 25 | 15 | 0 | 0 | 1796 | 82 | Gain/1.33 | 0/2.22 | Gain/3.11 | — | — |
| 10 | 55 | 21 | 21 | 0 | 0 | 1800 | 90 | 0.76/3.05 | 0/1.90 | — | — | — |
| 11 | 55 | 10 | 32 | 0 | 0 | 1780 | 92 | 0.44/2.44 | 2.67/5.78 | — | — | Gain/0.0 |
| 12 | 45 | 20 | 32 | 0 | 0 | 1757 | 90 | 0.44/1.78 | 0.88/2.19 | 0/3.95 | — | — |
| 13 | 45 | 20 | 32 | 0 | 0 | 1802 | 92 | 0/2.63 | 0.44/2.19 | — | 1.32/4.82 | — |
| 14 | 37.5 | 30 | 30 | 0 | 0 | 1802 | 96 | 0/1.33 | 0.44/1.78 | — | — | — |
| 15 | 37.5 | 20 | 40 | 0 | 0 | 1782 | 95 | Gain/1.33 | Gain/4.0 | — | — | — |
| 16 | 30 | 25 | 42.5 | 0 | 0 | 1778 | 91 | Gain/2.19 | 0/2.67 | — | — | — |

*If the total wt. % does not add up to 100 wt. %, it means that a small amount (about 2.5 wt. % or less) of binder such as CaO, ZrO$_2$, or Al$_2$O$_3$ is used to bring the total to 100 wt. %

What is claimed is:

1. A side dam for use in strip casting operations, comprising:
 a ceramic composite consisting essentially of about 10 to about 40 wt. % mullite; about 5 to about 35 wt. % aluminium nitride; and at least about 20 wt. % boron nitride;
 having surfaces being exposed to molten metal of at least about 1500° C. and for at least one hour; and said exposed surfaces are at least 80% covered by a reactive layer for providing erosion resistance to the exposed surfaces in said molten metal.

2. The side dam of claim 1, wherein said ceramic composite consists essentially of about 15 to 35 wt. % mullite; about 5 to 30 wt. % aluminium nitride; and
 at least about 25 wt. % boron nitride.

3. The side dam of claim 1, wherein said reactive layer coating covers at least 85% of exposed surfaces of said article.

4. The side dam of claim 1, wherein said composite has a sliding coefficient of friction of about 0.8 or less.

5. The side dam of claim 1, wherein said composite has a sliding coefficient of friction of about 0.4 to about 0.80.

6. The side dam of claim 1, wherein said composite has a wear rate of less than about 0.2 mm$^3$/N/m.

7. The side dam of claim 1, wherein said composite has a wear rate of less than about 0.15 mm$^3$/N/m.

8. The side dam of claim 7, wherein said composite has a wear rate of about less than 0.15 mm$^3$/N/m and a sliding coefficient of friction of about 0.4 to about 0.80.

9. A method for utilizing a side dam in casting operations, said method comprising:
   a) providing a shaped side dam comprising a ceramic composite consisting essentially of about 10 to about 40 wt. % mullite; about 10 to about 35 wt. % aluminium nitride; and at least about 20 wt. % boron nitride, said side dam having been fired and dried in an inert-based atmosphere at a temperature of about 1300 to 2000° C.;
   b) exposing surfaces of said shaped side dam to molten metal of at least about 1500° C. to form a reactive layer covering at least 80% of said exposed surfaces of said side dam, for providing erosion resistance to the exposed surfaces in said molten metal.

10. The method of claim 9, wherein said composite forming said side dam has a sliding coefficient of friction of about 0.8 or less.

11. The method of claim 9, wherein said composite forming said side dam has a wear rate of less than about 0.2 mm$^3$/N/m.

12. The method of claim 9, wherein said composite forming said side dam consists essentially of about 15 to 35 wt. % mullite; about 5 to 30 wt. % aluminium nitride; and at least about 25 wt. % boron nitride.

* * * * *